(12) United States Patent
Frane et al.

(10) Patent No.: US 6,334,263 B1
(45) Date of Patent: Jan. 1, 2002

(54) YOKE STRAIGHTENING FIXTURE

(75) Inventors: Michael L. Frane, Ft. Wayne; John H. Urick, Wolcottville, both of IN (US)

(73) Assignee: Spicer Technology, Inc., Ft. Wayne, IN (US)

( * ) Notice: Subject to any disclaimer, the term of this patent is extended or adjusted under 35 U.S.C. 154(b) by 0 days.

(21) Appl. No.: 09/182,633

(22) Filed: Oct. 30, 1998

(51) Int. Cl.[7] .................................................. G01B 5/25
(52) U.S. Cl. ....................................................... 33/533
(58) Field of Search ........................................... 33/533

(56) References Cited

U.S. PATENT DOCUMENTS

| | | | | |
|---|---|---|---|---|
| 4,215,482 A | * | 8/1980 | Szewczyk | 33/661 |
| 4,406,067 A | * | 9/1983 | Ulbing | 33/520 |
| 4,577,413 A | * | 3/1986 | Mason | 33/203.18 |
| 4,594,757 A | | 6/1986 | Johnson, Jr. | 33/533 X |
| 4,625,419 A | * | 12/1986 | Beissbarth | 33/203.17 |
| 4,696,190 A | | 9/1987 | Bucher et al. | 33/533 X |
| 4,790,079 A | * | 12/1988 | Meyers | 33/533 X |
| 4,942,666 A | * | 7/1990 | Wickmann et al. | 33/203.18 |
| 5,639,953 A | | 6/1997 | Renslow | 33/533 X |
| 5,644,853 A | | 7/1997 | Dixon | 33/506 |
| 5,694,699 A | * | 12/1997 | Folson | 33/533 X |

* cited by examiner

Primary Examiner—Thomas P. Noland
(74) Attorney, Agent, or Firm—Liniak, Berenato, Longacre & White

(57) ABSTRACT

A yoke straightening fixture adapted to engage the ears of a yoke shaft which is in turn attached to an axle shaft. The fixture has a longitudinal extending central bore to facilitate an aligned rotatable connection to a connecting member of a straightening device. The fixture comprises a pair of opposing recesses configured to receive and retain opposite ears of the yoke which is in turn attached to the shaft to be straightened. The opposing recesses are dimensioned to align the shaft with the fixture and consequently align the shaft with the straightening device. Two pairs of opposing recesses may be employed in a single fixture to facilitate connection to different size yokes. A front projection member is also formed to penetrate the yoke. The projection member is dimensioned to snugly fit between the ears of the yoke to form a positive aligned connection between the shaft and straightening device.

7 Claims, 4 Drawing Sheets

YOKE STRAIGHTENING FIXTURE

BACKGROUND OF THE INVENTION

1. Field of the Invention

The present invention relates to a yoke straightening fixture and particularly to a fixture which is designed to engage between the ears of yoke of a yoke shaft.

2. Description of the Prior Art

Various shaft straightening devices are known in the art. U.S. Pat. No. 4,594,757 to Johnson, Jr. and U.S. Pat No. 4,696,190 to Bucher et al. each disclose tube straightening devices and are incorporated herein by reference. However, each of these references suffers from the drawback that it is difficult to align the ends of the shafts with the straightening device.

The prior art straightening devices have difficulty aligning drive shafts having a universal joint welded to one end to the straightening device. Using these prior art devices requires eyeballing the center of the holes of the joint yoke which receives the spider, and rotating the yoke and eyeballing the centers of the holes to assure alignment of the shaft with the straightening device. Other methods include using sensors or calipers to sense and manipulate the shaft end into alignment with the straightening device. Such prior art devices are cumbersome time consuming and in accurate.

U.S. Pat. 5,644,853 to Dixon discloses a Broad head aligner. However, this aligner merely discloses a cone-shaped recess to receive the point of the head of the arrow.

It is an object of the present invention to provide a yoke straightening fixture which engages the ears of a universal joint to quickly and accurately align the centerline of the shaft with the straightening device while simultaneously providing a connection therebetween.

SUMMARY OF THE INVENTION

The present invention comprises a fixture adapted to engage the ears of a yoke which is attached to a yoke shaft. The fixture has a longitudinal extending central bore to facilitate an aligned connection to a connecting member of a straightening device. The fixture comprises a pair of opposing recesses configured to receive and retain opposite ears of a yoke which is attached to a shaft to be straightened. The opposing recesses are dimensioned to align the shaft with the fixture and consequently align the shaft with the straightening device. Two pairs of opposing recesses may be employed in a single fixture to facilitate connection to different size yokes.

BRIEF DESCRIPTION OF THE DRAWINGS

FIG. 1 is a front view of the fixture according to the present invention.

DETAILED DESCRIPTION OF THE PREFERRED EMBODIMENT

Figure 7:
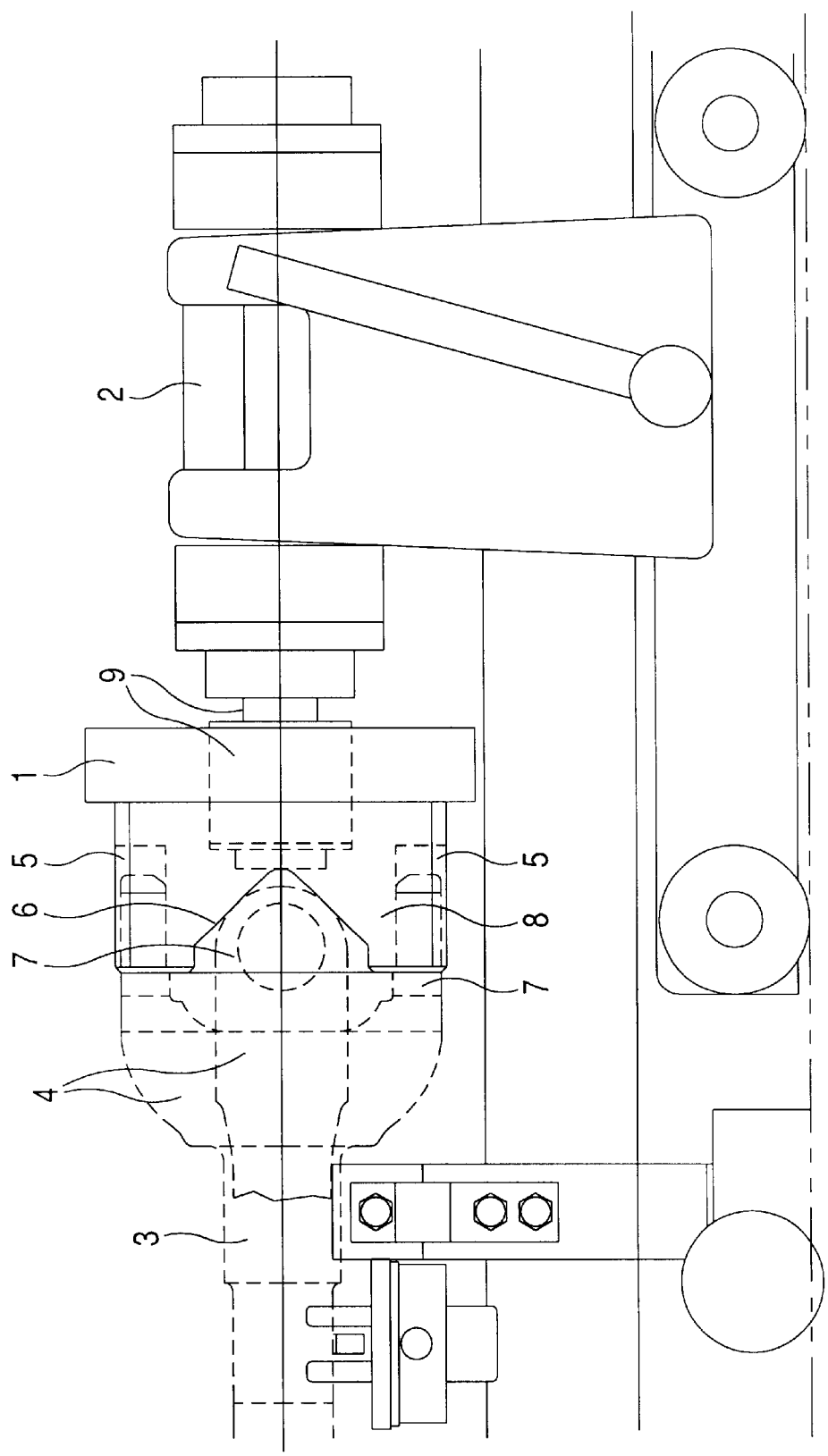
FIG. 7 is a side view of the fixture according to the present invention assembled with a straightening device and a yoke attached to a shaft.

FIG. 7 depicts the yoke straightening fixture 1 mounted to a straightening device 2. A yoke 4 is welded to the end of a shaft 3 to be straightened. Two different size yokes are represented by the dashed lines. The fixture 1 is adapted to receive and retain either of the two different size yokes 4. The fixture has two pairs of opposing v-shaped recesses 5,6 to accommodate the ears of 7 of the yoke 4.

Figure 1:
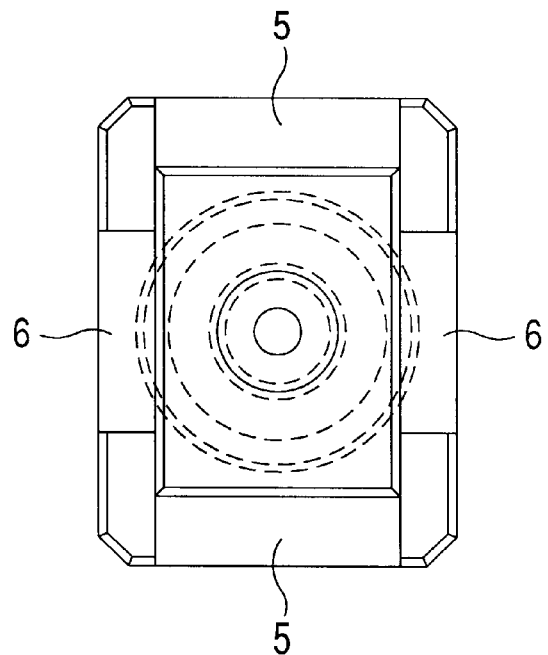
FIG. 1 is
Figure 2:
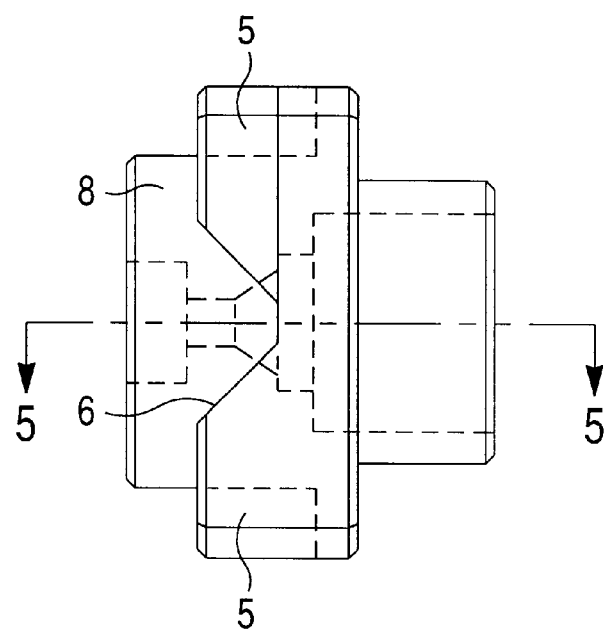
FIG. 2 is a side view of the fixture of FIG. 1 according to the present invention.
Figure 3:
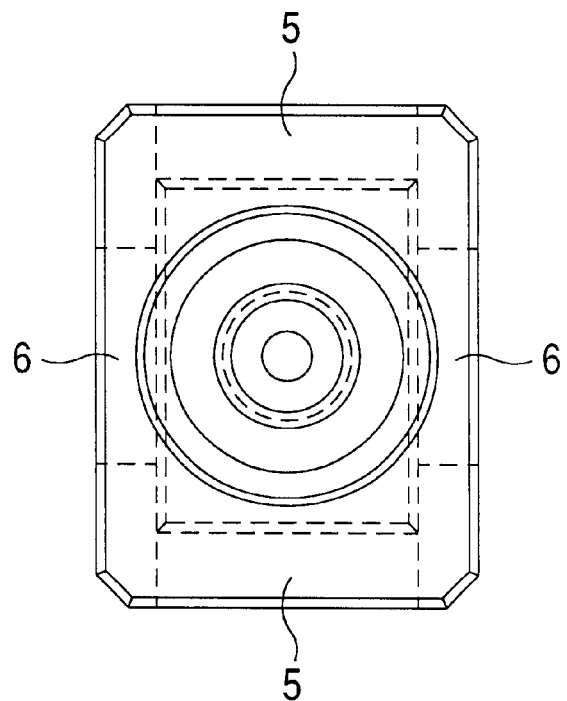
FIG. 3 is rear view of the fixture of FIG. 1 according to the present invention.
Figure 4:
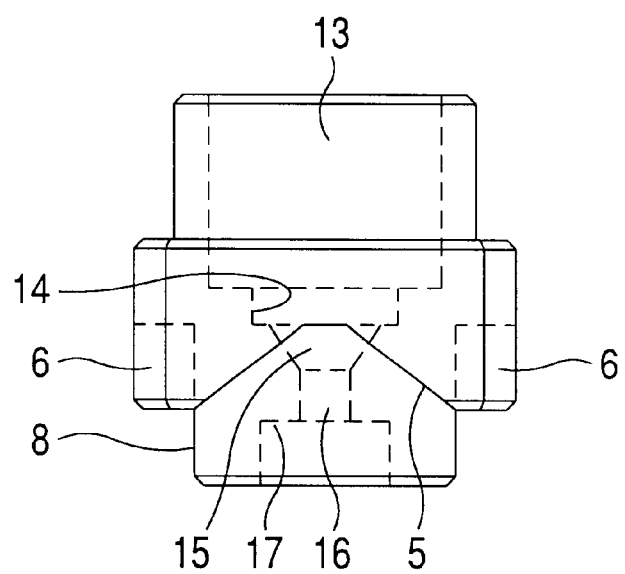
FIG. 4 is a top view of the fixture of FIG. 1 according to the present invention.

FIGS. 1–4 represent a more detailed depiction of the yoke straightening fixture. As can be seen in FIG. 2, a v-shaped recess 6 is formed in the fixture 1 and is dimensioned to receive and retain the ears of a yoke of a yoke shaft. A projection portion 8 of the fixture extends within the yoke 4 and is disposed between the ears 7. The projection portion 8 is dimension to snugly fit between the ears to facilitate accurate positioning of the shaft with respect to the straightening device as well as providing a positive connection therebetween. In the preferred embodiment the projection portion 8 is a rectangular projection having a first width corresponding the distance between two ears of a first sized yoke and a length corresponding to the distance between the ears of a second sized yoke. The dimensions of the projection portion 8 along with the corresponding v-shaped notches or recesses 5,6 together form a fixture which is adapted to accurately and positively retain a yoke shaft to be straightened aligned with the straightening device.

Figure 6:
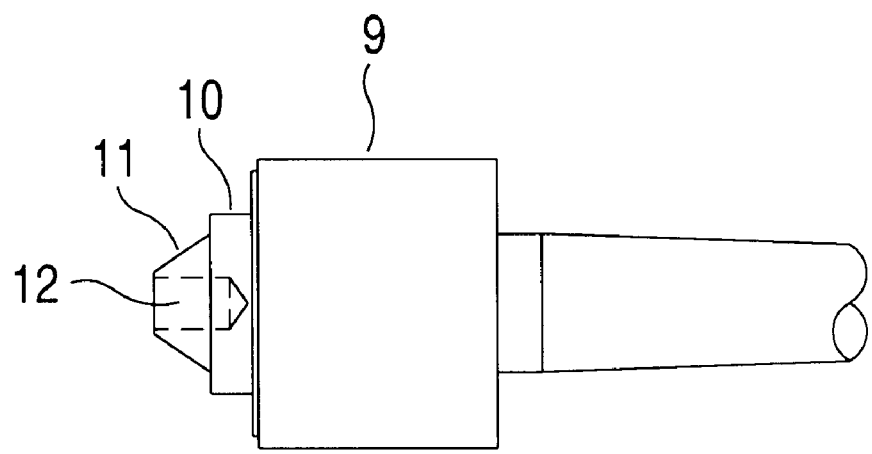
FIG. 6 is a side view of a connecting portion of the straightening device.

Referring to FIG. 6, a connecting member, is rotatably attached to the straightening device 2. The connecting member rotates about a centerline with respect to the straightening device. The connecting member has a profile of varied thickness in a front portion which is adapted to connect to the fixture 1. The front portion has a stepped portion and a tapered portion 11. The front portion of the connecting member 9 also has a central bore 12 having internal threads to accept a screw facilitating connection to the fixture.

Figure 5:
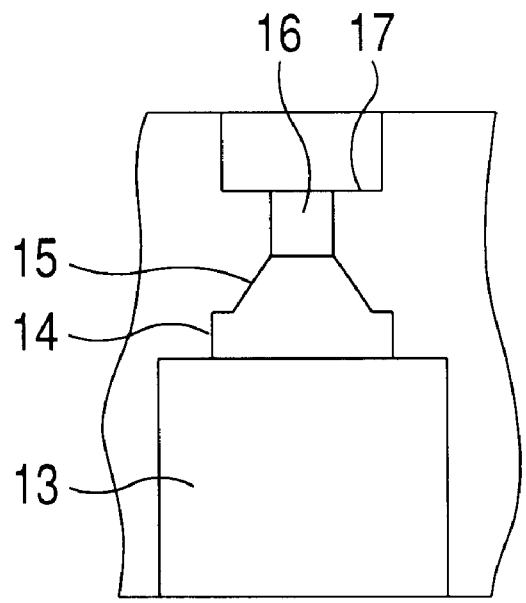
FIG. 5 is a partial sectional view of taken along line 5—5 of FIG. 2 of the fixture according to the present invention.

The center of the fixture 1 has a longitudinally bore extending through the center of the fixture to facilitate a connection between to the connecting member 9. FIG. 5 represents a partial cross sectional view of the fixture 1 revealing the inner contour of the bore. The longitudinal bore 13 of fixture 1, has a stepped portion 14 and cone shaped portion 15 dimensions to snugly receive stepped portion 10 and cone shaped portion 11 of the connecting member 9 respectively. Once the connecting member 9 is inserted in bore 13 of the fixture, a screw is inserted in the left portion 16 of bore 13 for threading engagement with the connecting member 9. The screw head will rest against shoulder 17 so that sufficient tightening of the screw will form a positive and tight connection between the connecting member and fixture 1.

Once the fixture 1 is secured to the connecting member 9, it to will be rotatably mounted to the straightening device. The shaft 3 may then be rotatably mounted to the straightening device in an aligned fashion simply by placing the ears 6 of the yoke 7 of the yoke shaft in the appropriate v-shaped recesses of the fixture 1. Once the yoke shaft is rotatably connected to the straightening device in an accurately aligned fashion, the shaft may be straightened in a conventional manner.

While the foregoing invention has been shown and described with reference to a specific preferred embodiment, it will be understood by those possessing skill in the art that various changes and modifications may be made without departing from the spirit and scope of the invention.

What is claimed is:

1. A combination fixture, straightening device and shaft, said shaft comprising:
   a first yoke of a yoke shaft connected to a first end, said yoke having a first pair of opposing ears;
   said straightening device having a connection member rotatably mounted thereto;
   said fixture having a pair of recesses and a projection portion disposed between said recessed;
   wherein said fixture is attached to said connection member thereby providing a rotatable connection between said fixture and said straightening device, said pair of opposing ears of said yoke being disposed in a corresponding one of said recesses and said projection portion being disposed between said ears thereby forming an aligned rotatable connection between said shaft and said straightening device.

2. The combination according to claim 1, wherein said fixture further comprises a second pair of opposing recesses adapted to receive and retain a second pair of ears of a second yoke, said second pair of ears having a different size than said first pair of ears.

3. The combination according to claim 1, wherein said fixture further includes a longitudinal central bore extending therethrough, said bore having an internal profile a first portion of which corresponds to an external profile of said connection member of said straightening device, a second portion of said internal profile being adapted to receive and retain a screw to threadingly engage said connection member to for a connection between said fixture and said connection member.

4. The combination according to claim 1, wherein said pair of recesses are substantially V-shaped when viewed in cross section.

5. A combination fixture, shaft and shaft straightening device; said shaft having a yoke of a yoke shaft attached to a first end thereof, said combination comprising:
   a first connection means rotatably connecting said fixture to said shaft straightening device; and
   a second means for simultaneously connecting and aligning said yoke shaft with said fixture thereby forming an aligned rotatable connection between said shaft and said straightening device; wherein said second means for simultaneously connecting and aligning said yoke and said shaft to said fixture includes;
   a pair of opposing recesses formed in said fixture, said recesses dimensioned to snugly receive and retain a corresponding one of a pair of ears extending from said yoke; and
   a projection portion extending from said fixture and snugly disposed between said ears.

6. The combination according to claim 5, wherein said pair of opposing recesses includes two pairs of opposing recesses dimensioned to receive and retain a corresponding pair of different size yokes.

7. The combination according to claim 6, wherein said two pairs of recesses are substantially V-shaped when viewed in cross section.

* * * * *